Feb. 14, 1950  V. DECARLO  2,497,211
HEDGE TRIMMER

Filed May 14, 1947  2 Sheets-Sheet 1

Inventor
Vito Decarlo
By Clarence A. O'Brien
and Harvey B. Jacobson
Attorneys

Feb. 14, 1950 V. DECARLO 2,497,211
HEDGE TRIMMER
Filed May 14, 1947 2 Sheets-Sheet 2
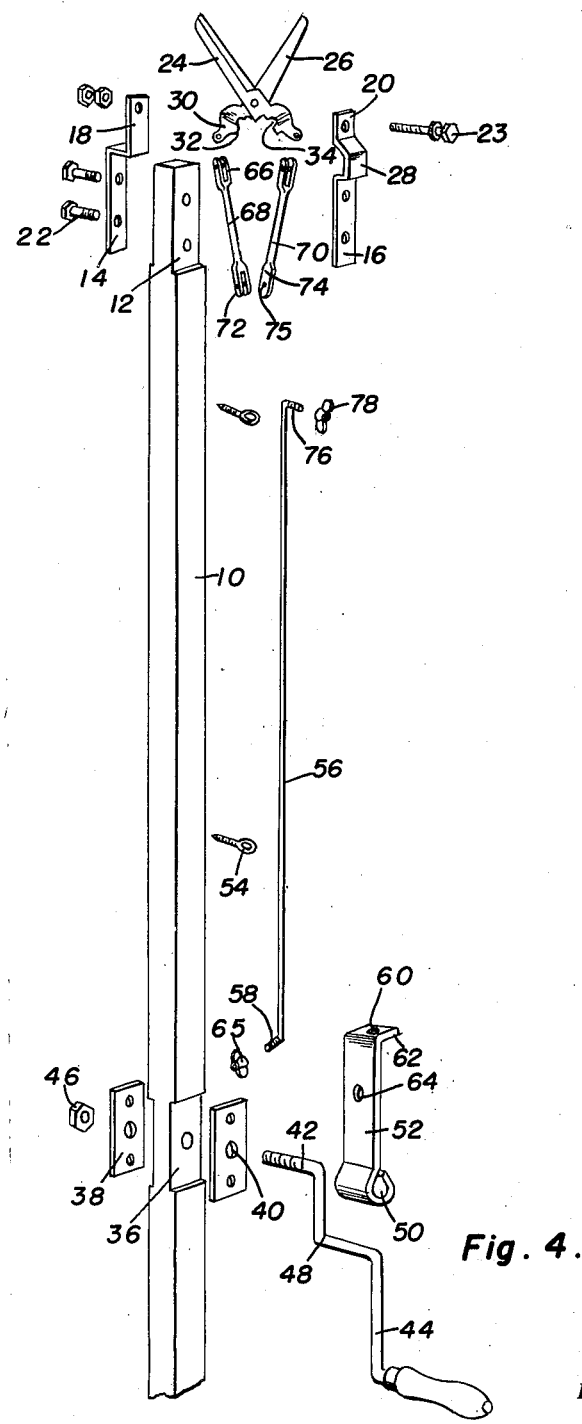
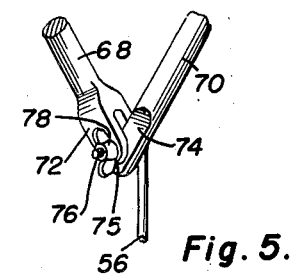
Fig. 6.
Fig. 5.
Fig. 4.
Inventor
Vito Decarlo
By Clarence A. O'Brien
and Harvey B. Jacobson
Attorneys Patented Feb. 14, 1950

2,497,211

UNITED STATES PATENT OFFICE 2,497,211

HEDGE TRIMMER

Vito Decarlo, New Rochelle, N. Y.

Application May 14, 1947, Serial No. 748,073

2 Claims. (Cl. 30—247)

This invention relates to new and useful improvements in hedge trimmers and the primary object of the present invention is to provide a device for trimming tall evergreens and hedges.

Another important object of the present invention is to provide a trimmer so designed as to permit one man to conveniently trim tall hedges and the like without the use of a ladder.

A further object of the present invention is to provide a pair of shears including novel and improved means for operating the shears.

A still further aim of the present invention is to provide a hedge trimmer that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 4 is a group perspective view of the present hedge trimmer;

Figure 5 is an enlarged fragmentary elevational view of the connecting links and reciprocating rod used in conjunction with this hedge trimmer; and Fig. 6 is an enlarged fragmentary sectional view of the upper end of the device, with parts broken away and shown in section.

Figure 1:
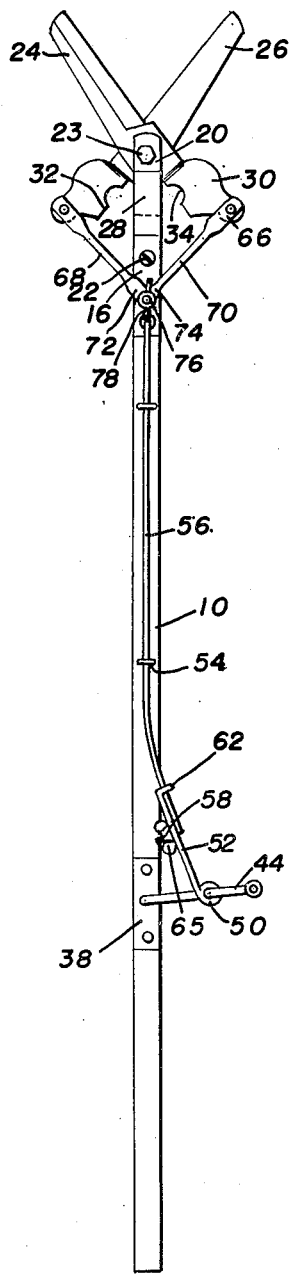
Figure 1 is a front elevational view of the present invention.
Figures 2, 3:
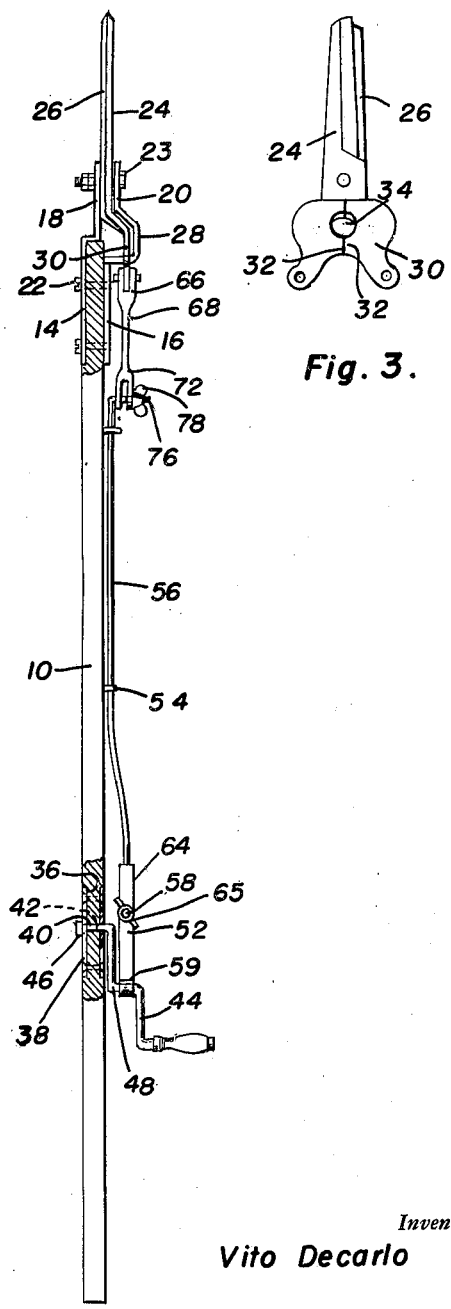
Figure 2 is a side elevational view of Figure 1, with parts broken away and shown in section.
Figure 3 is a front elevational view of the shears used in the present invention.

Referring now to the drawings in detail, wherein, for the purpose of illustration, there is disclosed a preferred embodiment of the present invention, the numeral 10 represents an elongated handle, one terminal portion of which is notched, as at 12, to receive the terminal portions 14 and 16 of a pair of shears supporting plates 18 and 20, that are secured to the handle by fastening means 22. One of these plates, for example 18, is bent inwardly to bear on the outer face of the handle and then extends upwardly to oppose in spaced relationship the outer end of the other plate 20. Pivoted between the opposed outer ends of plates 18 and 20, as at 23, are cutting blades 24 and 26, and plate 20 is provided with a loop 28 permitting opening and closing of the blades without contacting the plate 20. These cutting blades are provided with outwardly turned arcuate shanks 30, in the bearing edges 32 of which are opposed arcuate slots 34.

Intermediate one end of handle 10 and in opposed faces thereof is provided a notched portion 36 that receives a pair of reinforcing plates 38. Extending through the plates and through the handle is an aligned aperture 40 in which is journaled one end 42 of a crank handle 44. The terminal portion of this end 42 is threaded to engageably receive a nut or the like 46 whereby the handle is removable from the plates and the handle.

Integral with the crank handle 44 is a right-angular portion 48 on which is loosely mounted the sleeve portion 50 of a connecting link 52.

Loosely mounted in spaced eyes 54 carried by the handle 10 is an elongated reciprocating rod 56, one terminal end of which is bent into a right angular externally threaded extension 58, that slips through an aperture 60 in the out-turned end 62 of link 52 and engages a further aperture 64 in the body of the link for tightly holding the rod to the link 52. A wing nut or the like 65 is engageably received on this extension.

Pivotally secured to the respective shank portions of the blades 24 and 26 are the bifurcated ends 66 of a pair of link arms 68 and 70.

The free end of one of these arms, as for example 68, is bifurcated, as at 72, to receive the flat free end 74 of the other arm 70. These ends 72 and 74 are provided with aligned apertures 75 through which is extended the out-turned externally threaded end 76 of rod 56, to pivotally connect the said arms. The terminal portion of end 76 engageably receives a wing nut or the like 78 to prevent disengagement of the rod from the arms 68 and 70.

In practical use of the device, by pulling the crank handle inwardly or downwardly, the cutting blades 24 and 26 are oscillated inwardly to cut a branch or the like. By raising or extending forwardly the handle 44, the cutting blades are spread apart so that another branch or the like to be cut may be placed therebetween by manipulating the handle 10.

It has been found that this type of trimmer is particularly useful in trimming evergreens and high hedges whereby one can conveniently use the device without a ladder.

For use of the device for extremely high trees, the handle 10 may be replaced by a longer handle and the length of rod 56 is also increased.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

What I claim as new is:

1. A trimmer for elevated hedges comprising an elongated handle, inner and outer supporting members carried by said handle at one end, said outer supporting member having an offset portion, a pair of companion blades pivoted between said supporting members and including offset shank portions, the shank portions of said blades being notched to receive the offset portion of said outer supporting member during closing movement of said blades, and means for operating said blades, said means including a flexible bar, spaced guides on said handle slidably receiving the bar, a crank handle journaled for rotation on said elongated handle, a link journaled on said crank handle and secured to one end of said bar, and links connecting the other end of said bar to the shank portions of said blades.

2. A trimmer for elevated hedges comprising an elongated main handle, a pair of plates having inner and outer end portions, means securing the inner end portions of said plates to said main handle, the outer end portions of said plates being spaced relative to each other, a pair of blades pivoted to each other and between the outer end portions of said plates, said blades having off-set shank portions spaced relative to said handle, one of said plates having a loop adjacent its outer end, said shank portions having notches receiving said loop during closing movement of said blades, a reciprocable member carried by said handle and connected to said shank portions, and means for actuating said member.

VITO DECARLO.

REFERENCES CITED

The following references are of record in the file of this patent:

UNITED STATES PATENTS

| Number | Name | Date |
|---|---|---|
| 106,253 | Bullard | Aug. 9, 1870 |
| 914,731 | Klitsch | Mar. 9, 1909 |
| 1,199,134 | Walters et al. | Sept. 26, 1916 |
| 1,596,777 | Takasomi et al. | Aug. 17, 1926 |
| 2,236,955 | Thompson | Apr. 1, 1941 |